United States Patent
Hsu et al.

(10) Patent No.: US 12,472,287 B2
(45) Date of Patent: Nov. 18, 2025

(54) POROELASTIC BIOMATERIAL FOR ORTHOPEDIC DEVICES

(71) Applicant: LEAP Polymers LLC, Lake Mary, FL (US)

(72) Inventors: Tim Hsu, Lake Mary, FL (US); Minren Lin, Lake Mary, FL (US); Saadyah Averick, Lake Mary, FL (US); Boyle C. Cheng, Lake Mary, FL (US)

(73) Assignee: LEAP Polymers INC., Lewes, DE (US)

( * ) Notice: Subject to any disclaimer, the term of this patent is extended or adjusted under 35 U.S.C. 154(b) by 724 days.

(21) Appl. No.: 17/873,402

(22) Filed: Jul. 26, 2022

(65) Prior Publication Data

US 2023/0037593 A1 Feb. 9, 2023

Related U.S. Application Data

(63) Continuation of application No. PCT/US2022/038262, filed on Jul. 26, 2022.

(60) Provisional application No. 63/225,591, filed on Jul. 26, 2021.

(51) Int. Cl.
| | |
|---|---|
| *C08J 9/26* | (2006.01) |
| *A61L 27/18* | (2006.01) |
| *A61L 27/56* | (2006.01) |
| *B29C 45/00* | (2006.01) |

(Continued)

(52) U.S. Cl.
CPC .............. *A61L 27/56* (2013.01); *A61L 27/18* (2013.01); *B29C 45/0001* (2013.01); *B29C 67/202* (2013.01); *C08J 9/26* (2013.01); *A61L 2430/38* (2013.01); *B29K 2071/00* (2013.01); *B29K 2995/0046* (2013.01); *B29K 2995/0056* (2013.01)

(58) Field of Classification Search
CPC .................................. C08J 9/26; B29C 67/202
See application file for complete search history.

(56) References Cited

U.S. PATENT DOCUMENTS

| | | |
|---|---|---|
| 4,721,732 A | 1/1988 | Dubrow et al. |
| 4,859,715 A | 8/1989 | Dubrow et al. |
| 5,205,968 A | 4/1993 | Damrow et al. |

(Continued)

FOREIGN PATENT DOCUMENTS

| | | |
|---|---|---|
| WO | 2005/009729 A2 | 2/2005 |
| WO | 2017/100366 A1 | 6/2017 |

OTHER PUBLICATIONS

Ma, J. et al. Bi-directional regulatable mechanical properties of 3D braided polyetheretherketone (PEEK). Materials Science & Engineering C 103 (2019) 109811. (Year: 2019).*

(Continued)

*Primary Examiner* — Christina H.W. Rosebach
(74) *Attorney, Agent, or Firm* — BakerHostetler

(57) ABSTRACT

A poroelastic biomaterial including a polyaryletherketone (PAEK) matrix polymer and a plurality of tortuous channels extending from one surface to another surface of the biomaterial is disclosed. Advantageously, the poroelastic biomaterial can have a porosity from about 5% to about 40% and high mechanical properties. The poroelastic biomaterials can be fabricated into orthopedic implant devices and can be used as a tissue scaffolds.

18 Claims, 8 Drawing Sheets

A          B

(51) Int. Cl.
  *B29C 67/20* (2006.01)
  *B29K 71/00* (2006.01)

(56) References Cited

U.S. PATENT DOCUMENTS

| | | | |
|---|---|---|---|
| 5,425,772 | A | 6/1995 | Brantigan |
| 5,860,973 | A | 1/1999 | Michelson |
| 7,176,273 | B2 | 2/2007 | Yuan et al. |
| 7,229,580 | B2 | 6/2007 | Yuan |
| 7,368,526 | B2 | 5/2008 | Yuan et al. |
| 7,655,705 | B2 | 2/2010 | Scherzer et al. |
| 10,398,236 | B2 | 9/2019 | Achten et al. |
| 10,842,645 | B2 | 11/2020 | Nebosky et al. |
| 10,912,866 | B2 | 2/2021 | Zhang et al. |
| 10,945,854 | B2 | 3/2021 | Roeder et al. |
| 11,051,953 | B2 | 7/2021 | Motley et al. |
| 2004/0222169 | A1 | 11/2004 | Yuan |
| 2007/0116737 | A1 | 5/2007 | Favis et al. |
| 2010/0331987 | A1 | 12/2010 | Gontarz et al. |
| 2014/0236299 | A1* | 8/2014 | Roeder ............ A61L 27/56 521/85 |
| 2015/0028510 | A1 | 1/2015 | Liu et al. |
| 2015/0037517 | A1 | 2/2015 | Buriak et al. |
| 2022/0080630 | A1* | 3/2022 | Farris ............ A61F 2/30965 |

OTHER PUBLICATIONS

Landy, B.C. et al. Mechanical and in vitro investigation of a porous PEEK foam for medical device implants. J Appl Biomater Funct Mater 2013; 11 (1): 35-44 (Year: 2013).*

Cafiero et al. "Microcellular foams from PEEK/PEI miscible blends", Proceedings of the Regional Conference Graz 2015—Polymer Processing Society PPS, AIP Conf. Proc. 1779, 090009 (2016) pp. 1-5.

Converse et al. "Mechanical properties of hydroxyapatite whisker reinforced polyetherketoneketone composite scaffolds", J. Mechanical Behavior Biomedical Materials (2009) 627-635.

Landy et al. "Mechanical and in vitro investigation of a porous PEEK foam for medical device implants", J Appl Biomater Funct Mater 2013; 11 (1): 35-44.

Roeder et al. "Porous and Bioactive PEEK Implants for Interbody Spinal Fusion", Advanced Materials & Processes/Oct. 2009, 46-48.

Sorrentino et al. "Polymeric Foams from High-Performance Thermoplastics", Advances in Polymer Technology, vol. 30, No. 3, 234-243 (2011).

Torstrick et al. "Impaction durability of porous polyether-etherketone (PEEK) and titanium-coated PEEK interbody fusion devices" The Spine Journal 18 (2018) 857-865.

Watanabe "Characterization of Engineering Plastics Plasticized Using Supercritical CO2", Polymers 2020, 12, 134; 1-10.

Evans et al. "High strength, surface porous polyether-ether-ketone for load-bearing orthopaedic implants", Acta Biomaterialia 13 (2015) 159-167.

Mehta, et al., "Microporous membranes based on poly(ether ether ketone) via thermally-induced phase separation", J. Membrane Sci, vol. 107, pp. 93-106, 1995.

International Search Report issued in International Patent Application No. PCT/US2022/038262 mailed Nov. 18, 2022.

* cited by examiner

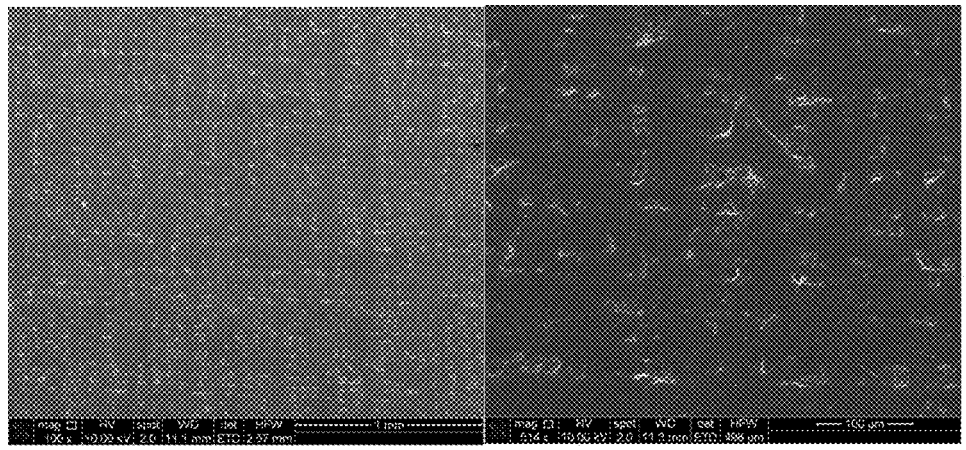
FIG. 3A: Commercial Spinal Implant Device made from PEEK
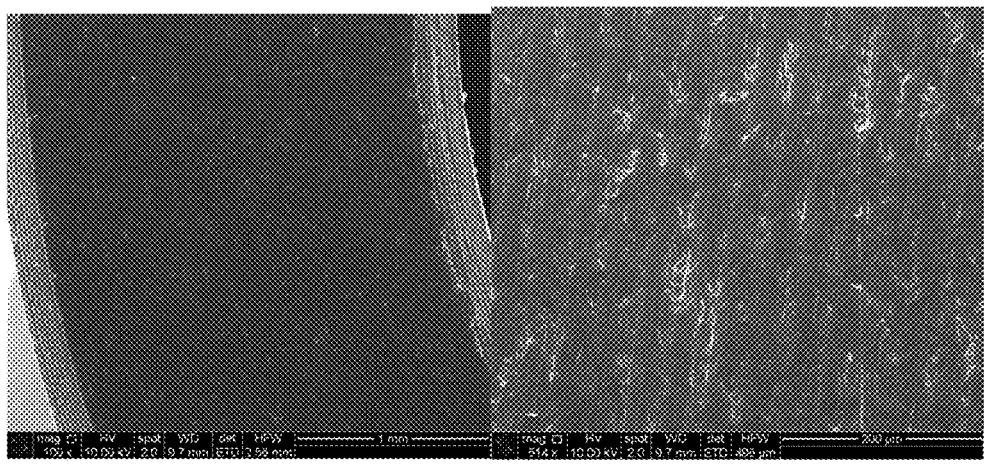
FIG. 3B: Machined PEEK Cup
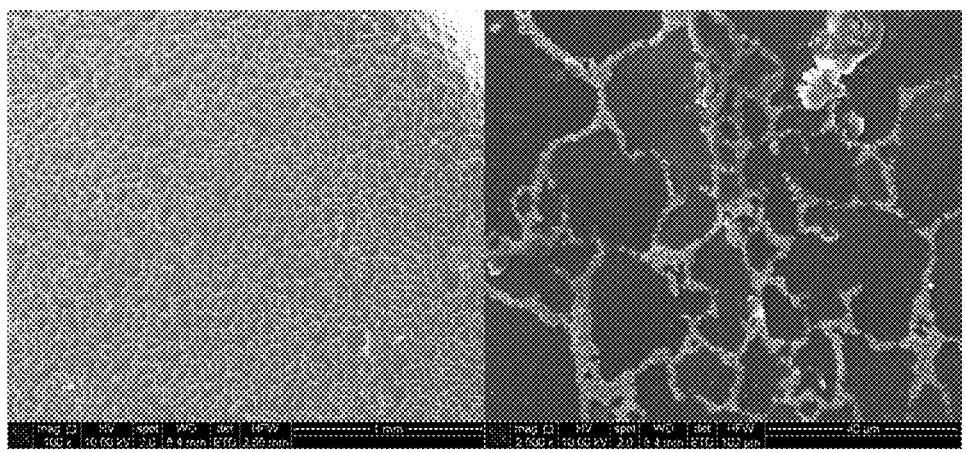
FIG. 3C: Poroelastic PEEK Injection Molded PEI/PEEK blend Injection-Molded, Extracted Poroelastic PEEK

POROELASTIC BIOMATERIAL FOR ORTHOPEDIC DEVICES

CROSS-REFERENCE TO RELATED APPLICATION

This application is a continuation of International Application No. PCT/US2022/038262 having an international filing date of 26 Jul. 2022 and this application claims the benefit of U.S. Provisional Application No. 63/225,591 filed 26 Jul. 2021, the entire disclosures of each of which are hereby incorporated by reference herein.

TECHNICAL FIELD

The present disclosure relates to poroelastic biomaterials that include a polyaryletherketone matrix polymer and tortuous channels extending from one surface to another surface of the biomaterial and orthopedic implant devices comprising such poroelastic biomaterials.

BACKGROUND

Orthopedic implants, particularly interbody spacers, ideally have a combination of characteristics and properties that promote osseointegration at the bone-implant interface. However, many materials and structures do not allow sufficient bone growth or lack other desirable physical properties as a trade-off for the selection of the material or its structure or both. For example, some implants may provide a pore size that is generally within a desirable range for bone growth, but are too stiff to allow bone within the porous structure of the implant to be properly loaded. The lack of loading prevents bone growth in the interior of the devices. In other implants, the stiffness may be generally within a desirable range, but in order to achieve the desired stiffness, the device has pores that are too large or too small to facilitate proper bone growth.

A particular difficult orthopedic implant to design with a combination of desirable characteristics and properties for bone fusion is an interbody spacer intended for placement between vertebral bodies in spinal fusion procedures. In addition to osseointegration, such spinal fusion devices further require sufficient physical properties to support the spine.

To address certain characteristics and properties in the design of an implant device, WO2017/100366 discloses a porous interbody spacer having packs of coils made from titanium or titanium alloys prepared by additive manufacturing. However, use of titanium, as well as other metals and alloys thereof, suffer from the disadvantage of inhibiting post-operative radiographic assessment by various imaging modalities including x-ray analysis due to the metal's radiopaque nature.

Polyetheretherketone (PEEK) and polyetherketoneketone (PEKK) are materials other than metals that have been used for orthopedic implants. PEEK and PEKK belong to a family of high performance polyaryletherketone (PAEK) polymers and are generally thermally and chemically stable. While PEEK has many attractive characteristics, such as a bulk modulus of elasticity similar to bone and can enable post-operative radiographic assessment of fusion of a device made therefrom, the inert nature of the material tends to limit osseointegration.

To address the inert nature of PEEK and enhance its affinity to tissue, workers have introduced porosity to PEEK structures to promote osseointegration. For example, U.S. Pat. No. 10,945,854 and Roeder et al. (J. Mechanical Behavior of Biomedical Materials, 2009:2:627-635) disclose preparing porous composite materials which can include PEEK with anisometric reinforcing particles. These references disclose preparing porous composites by a process involving: (i) consolidating a suspension of PEEK polymer, reinforcing particles and porogen particles to form a preform, (ii) compression molding the preform, (iii) followed by leaching the porogen from the compression molded preform to form a composite having bulk porosity. Evans et al., however, report that such porous composites suffered up to 86% reduction in strength due to the high overall fraction of porosity and the relatively weak local bonds created during powder sintering. Evans et al., "High strength, surface porous polyether-ether-ketone for load-bearing orthopaedic implants", Acta Biomater. 2015:159-167. Evans et al. address the low mechanical properties of bulk porous PEEK materials by limiting porosity to the surface of a PEEK material while maintaining a solid core for mechanical integrity. Id. Such surface porous implant materials, however, limit osseointegration to the surface of the implant.

Hence, a continuing need exists for materials and structures for orthopedic implant devices that can promote osseointegration and have mechanical properties similar to the bone or tissue replaced by the device.

SUMMARY OF THE DISCLOSURE

An advantage of the present disclosure is poroelastic biomaterials that include a polyaryletherketone (PAEK) matrix polymer and tortuous channels extending from one surface to another surface of the biomaterial, e.g., through the bulk or core of the biomaterial, while maintaining sufficiently high mechanical properties. Such poroelastic biomaterials can be used to form orthopedic implant devices that can promote osseointegration with appropriately sized tortuous channels through the device and physical properties that mimic bone.

These and other advantages are satisfied, at least in part, by a poroelastic biomaterial comprising a polyaryletherketone (PAEK) matrix polymer; and a plurality of tortuous channels extending from one surface to another surface of the biomaterial. The poroelastic biomaterial can be included as part of an orthopedic implant device such as an implant body of the device.

In an aspect of the present disclosure, the poroelastic biomaterials can be prepared by extracting an active polymeric component (A) from a shape, e.g., a shaped body, comprising a blend of the active polymeric component (A) with a matrix PAEK polymer (B) to form the poroelastic biomaterial. A blend of the active polymeric component (A) with the matrix PAEK polymer (B) can be injection molded to form the shape, or a blend of the active polymeric component (A) with the matrix PAEK polymer (B) can be formed in to the shape by machining the blend. Such shapes can be in the form of, or include in an implant device. The blend, in turn, can be formed by melt compounding the active polymeric component (A) with the matrix PAEK polymer (B). The active polymeric component (A) can be extracted by heat and/or solvent to form the poroelastic biomaterial.

In another aspect of the present disclosure, an orthopedic implant device can be prepared by injection molding a blend of an active polymeric component (A) with a matrix PAEK polymer (B) into a shape of an orthopedic implant device, wherein the active polymeric component (A) can be extracted from the PAEK matrix polymer to form a poroelastic biomaterial including a plurality of tortuous channels extending from one surface to another surface of the biomaterial. The blend can be formed by melt compounding the active polymeric component (A) with the matrix PAEK polymer (B). The active polymeric component (A) can be extracted by heat and/or solvent.

Embodiments of the present disclosure include one or more of the following features individually or combined. For example, in some embodiments the poroelastic biomaterials can have a porosity ranging from about 5% to about 40% and values there between. In some embodiments, the poroelastic biomaterials can include a plurality of tortuous channels with a diameter size in the range of from about 10 microns to about 3,000 microns, e.g., from about 50 microns to about 1,500 microns, such as from about 100 microns to about 800 microns. In other embodiments, the poroelastic biomaterials can have a tensile or compressive strain at break at least as high as a corresponding PAEK polymer without channels or porosity/voids. For example, the poroelastic biomaterials can have a tensile or compressive strain at break of at least 20%, 40%, 50%, 70%, 100%, 150%, 200%, etc. greater than the tensile or compressive strain at break of the corresponding PAEK bulk polymer without tortuous channels or porosity/voids. In still further embodiments, the poroelastic biomaterials can have a tensile or compressive modulus of from about 200 megapascals (MPa) to about 2,000 MPa, e.g., from about 300 MPa to about 1,500 MPa. In other embodiments, the poroelastic biomaterials can have a tensile or a compressive strength at yield of from about 20 MPa to about 140 MPa. In still further embodiments, the PAEK matrix polymer can include or can be formed of a polyetheretherketone (PEEK) matrix polymer.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 1A shows an optical micrograph of the poroelastic biomaterial (poroelastic PEEK) and FIG. 1B shows a micro-computed tomography (micro-CT) image of the poroelastic biomaterial (poroelastic PEEK).

FIG. 2A is a SEM image showing a cross section of a commercial implant device made from PEEK; FIG. 2B is an SEM image of a cross section of a poroelastic biomaterial prepared according to aspect of the present disclosure.

FIGS. 3A, 3B and 3C are SEM images. FIG. 3A shows a commercial spinal implant device made from PEEK; FIG. 3B shows a machined unfilled PEEK cup; and FIG. 3C shows a poroelastic biomaterial prepared according to aspect of the present disclosure.

DETAILED DESCRIPTION OF THE DISCLOSURE

Figures 1A, 1B:
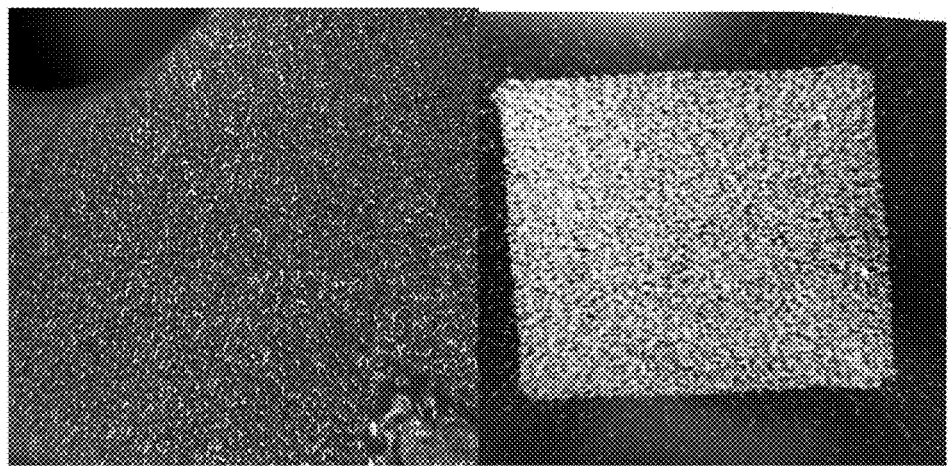
FIGS. 1A and 1B are images of an injection molded part made of a poroelastic biomaterial.

The present disclosure relates to poroelastic biomaterials that include a polyaryletherketone (PAEK) matrix polymer and a plurality of tortuous channels extending from one surface of the biomaterial to another surface of the biomaterial, e.g., through the bulk of the biomaterial. Advantageously, the tortuous channels are distributed throughout the PAEK matrix and can be distributed more or less uniformly throughout the PAEK matrix. The plurality of tortuous channels can have an approximate size from 10 microns to about 3,000 microns, e.g., the channels can have an approximate size from about 50 μm, 70 μm, 100 μm, 150 μm, 200 μm, 250 μm, 300 μm, 350 μm, 400 μm, 450 μm, 500 μm, 550 μm, 600 μm, 650 μm, 800 μm and values therebetween to about 2,500 μm, 2,000 μm, 1,500 μm, 1,000 μm, 950 μm, 900 μm, 850 μm, 800 μm, 750 μm, 700 μm, and values therebetween. It was observed that the size of the channels of the poroelastic biomaterials of the present application appear mostly irregular. Such channel sizes can be determined by measuring the poroelastic biomaterial under a microscope or equivalent techniques and estimating the largest width in a channel as the size of the channel even though the channel shape is irregular. However, it was observed that the tortuous channels extending from one surface to another surface of the biomaterial, e.g., through the bulk of the biomaterial, facilitate liquid transport through the biomaterial and can wick and redistribute aqueous fluids comparable to bone function.

Another advantage of the poroelastic biomaterials of the present disclosure includes the characteristic of high ductility. For example, the tensile strain or compressive strain at break for poroelastic biomaterials of the present disclosure can be at least as great as the corresponding bulk PAEK polymer without tortuous channels or porosity. In certain embodiments, tensile or compressive strain at break of a poroelastic PAEK is at least as high or higher than the corresponding PAEK bulk polymer without tortuous channels or porosity, e.g., the tensile or compressive strain at break of the poroelastic PAEK is at least 20%, 40%, 50%, 70%, 100%, 150%, 200%, etc. greater than the tensile or compressive strain at break of the corresponding PAEK bulk polymer without tortuous channels or porosity. For example, a poroelastic PEEK matrix polymer according to the present disclosure can have a tensile or compressive strain at break of at least 30%, 40%, 50%, 80% or higher.

Further, the poroelastic biomaterials of the present disclosure can have sufficiently high mechanical properties. In certain embodiments, the poroelastic biomaterial of the present disclosure maintains at least 10%, 20%, 30%, 40%, 50% or more of the strength or stiffness (modulus) of the corresponding bulk PAEK polymer without tortuous channels or porosity. For example, the tensile or compressive strength at yield for poroelastic PEEK matrix polymer of the present disclosure can range from about 20 MPa to about 140 MPa, e.g., from about 40 MPa to about 120 MPa, such as from about 50 MPa to about 115 MPa. The tensile or compressive modulus for poroelastic PEEK matrix polymer of the present disclosure can range from about 200 megapascals (MPa) to about 2,000 MPa, e.g., from about 300 MPa to about 1,500 MPa, such as from about 400 MPa to about 1,200 MPa. The mechanical properties provided above are poroelastic biomaterials without fillers. The mechanical properties can be increased in certain instances with addition of appropriate fillers to the matrix polymer. Tensile and compressive properties of poroelastic biomaterials of the present disclosure are determined by Standard Test Methods such as ASTM D638 and ASTM D695, respectively, or equivalent techniques. The poroelastic biomaterials of the present disclosure have mechanical properties that can mimic those of bone.

Poroelastic biomaterials having such tortuous channels and mechanical properties advantageously promote the vascularization and growth of bone on and within the biomaterial thereby improving bonding between the material and contacted tissue. Orthopedic implant devices including implants for human spine, hip, shoulder, and knee, which transmit substantial mechanical loads during day-to-day activities, can be fabricated from the poroelastic biomaterials of the present application. The poroelastic biomaterials of the present disclosure also can be used as a tissue scaffold.

Another advantage of the poroelastic biomaterial of the present disclosure is that the tortuous channels allow for impregnation of the poroelastic biomaterial with one or more osteoconductive agents, e.g., active agents that promote osseointegration of the biomaterial. One or more osteoconductive agents can be applied and loaded on various contact surfaces such as top and bottom surfaces of the biomaterial and throughout the bulk of the material. For example, one or more osteoconductive agents as a liquid or in a liquid carrier can be loaded throughout the biomaterial via transport of the liquid through the plurality of tortuous channels. The liquid medium can also include components that form gels such that the tortuous channels can be occupied with gels including one or more osteoconductive agents. In some aspects the liquid medium can be evaporated to leave the one or more osteoconductive agents as more or less dried osteoconductive agents loaded throughout the bulk of the biomaterial. Useful osteoconductive agents that can be practiced with the of the poroelastic biomaterial of the present disclosure include, without limitation, one or more growth factors (e.g., bone morphogenic protein (BMP)), transcription factors, matrix metalloproteinases, peptides such as P15 (a 15-amino acid long peptide (GTPGPQGIAGQRGVV), proteins, bone cells, progenitor cells, blood plasma, bone marrow aspirate, mRNA with or without carrier agents, CRISPR-Cas9 or other genome editing technology and combinations thereof. Useful liquid media include, for example, water and other aqueous media, alcohols, etc.

The poroelastic biomaterials of the present application readily can be prepared by extracting an active polymeric component (A) from a blend of the active polymeric component (A) with a matrix PAEK polymer (B) to form a poroelastic biomaterial. Such blends can form a variety of different morphologies depending on the blending conditions, composition, and material compatibility. The active polymeric component (A) in the A/B blend can be extracted with heat, solvent, or a combination thereof provided that the matrix PAEK polymer is maintained and preferably not significantly distorted during the extraction process. In some cases, additional active components can be added to modify the thermal and chemical stability of active polymeric component (A) to facilitate or accelerate extraction of the active polymeric component (A) from the A/B blend. Advantageously, the process of preparing a poroelastic biomaterial according to the present disclosure results in the biomaterial having a hydrophilic nature as shown by wicking of aqueous fluids into the biomaterial and mineralization of the biomaterial.

Many A/B compositions have been evaluated with a combination of different solvent or solvent systems to find a morphology and feasible extraction mechanism. The basic criteria for these combinations are believed to be as follows: (1) polymeric components (A) and (B) should preferably form reasonably compatible blends in the sense that gross phase separation of the components is not observed under the processing conditions to form the blend or an injection molded shape, part or device. However, polymeric components (A) and (B) are preferably not completely miscible. As used herein a compatible blend is an immiscible polymer blend that exhibits macroscopically uniform physical properties, which can be caused by sufficiently strong interactions between the component polymers. (2) When using a solvent or solvent system to extract active polymeric component (A), it is preferable to use at least one solvent that can swell the inert PAEK matrix while also having a strong affinity or solubility with the active polymeric component (A) to extract it with or without heat. In some cases, steam was used since it is an effective solvent that can swell PEEK at sufficient temperatures (above about 220° C.), without dissolving PEEK. In other cases, a solvent system of a two solvents can be used in which one solvent is selected to swell the PAEK matrix polymer while another solvent is selected to dissolve/extract the active polymeric component (A). (3) The extraction process preferably should be conducted at low enough temperature such that the morphology of the inert matrix PAEK polymer (B) is not significantly disrupted but at a high enough temperature and pressure combination to remove the active components (A) effectively.

Useful active polymeric components (A) that can be extracted from a PAEK matrix include, for example, polyetherimide (PEI), PEKK, polysulfone (PSU), polyethersulfone (PES), polyphenylsulfone (PPSU). Such PEI, PEKK, PSU, PES and PPSU polymeric components can be extracted with one or more solvents. In addition, active polymeric components (A) can include polymers that can be melt blended but can be extracted by degradation with heat such as one or more poly(alkene carbonate) copolymers, e.g., such as poly(ethylene carbonate), poly(propylene carbonate), poly(propylene/cyclohexene carbonate), poly(cyclohexene carbonate), etc. and combinations thereof. Such poly(alkene carbonate) copolymers are available from Empower Materials under the tradename QPAC®. These poly(alkene carbonate) copolymers can decomposed at elevated temperature in air (e.g., degradation onset in air at about 220° C.) to generated $CO_2$ gas and water.

Useful matrix PAEK polymer (B) components include polyetheretherketone (PEEK), semicrystalline polyetherketoneketone (PEKK), polyetherketones (PEK), polyetherketoneetherketoneketone (PEKEKK). PEEK and PEKK have similar chemical behavior but somewhat different crystallinity morphology.

An active polymeric component (A) can be combined with a matrix PAEK polymer (B) to form and A/B blend. The amount of the active polymeric component (A) and the matrix PAEK polymer (B) in the blend can vary from about 5-40 parts active polymeric component (A) to 95-60 parts of the matrix PAEK polymer (B) in the A/B blend. In some embodiments the amount of active polymeric component (A) as a weight percentage based on the total amounts of component (A) and component (B) ranges from about 5 wt % to about 40 wt %, such as from about 5 wt %, 10 wt %, 15 wt %, 20 wt %, etc. to about 40 wt %, 35 wt %, 30 wt %, 25 wt %, etc. and values therebetween. Since the active polymeric component (A) is extracted from the A/B blend when forming the poroelastic biomaterial, the porosity of the poroelastic biomaterial can be estimated from the initial amount of the respective components. As used herein, porosity refers to a percentage of the volume of voids over the total volume of the material. The porosity of the poroelastic biomaterial is estimated to be from about 5% to about 40%, e.g., from about 5%, 10%, 15%, 20%, etc. to about 40%, 35%, 30%, 25%, etc. and values therebetween.

It is preferable that the active polymeric component (A) and matrix PAEK polymer (B) components be combined in such a way as to form a macroscopically uniform blend of the components. For example, blends can be prepared by dry mixing the active polymeric component (A) with the matrix PAEK polymer (B), such as in a blender, with or without heat, or mixing the components with a solvent and removing the solvent to form the blend of the components. Alternatively, the blends can be formed by mixing and melting the polymeric components together such as in an extruder or similar device that can mix and heat polymeric components to melt compound the active polymeric component (A) with the matrix PAEK polymer (B) to form an A/B blend. An advantage of forming a blend by melt compounding is that the formed blend can then be directly injection molded in to a desired shape, e.g., a desired part or device, such as an orthopedic implant device. Alternatively, a melt compound blend can be extruded as pellets or other forms and store for later use. Further, a blend of the active polymeric component (A) with the matrix PAEK polymer (B) can be formed by injection molding, extrusion or compression molding into a shape e.g., a near-net shaped body, or by machining a bulk form such as rods or plates of the blend. The resulting near-net shapes or forms can then be machined to produce a desired part or device, such as an orthopedic implant device, before or after extraction of the active polymeric component (A) from the near-net shapes or forms.

In practicing aspects of forming a poroelastic biomaterial, blends of the active polymeric component (A) and the matrix PAEK polymer (B) can be formed into a shape, e.g., a desirable part or device. Such shapes can be formed by injection molding with an extruder or by machining. It is preferable to form desirable parts and devices by injection molding to reduce costs and increase through-put. Further, injection molding polymeric materials, such as the blends prepared from the components of the present disclosure, advantageously tends to result in shapes having higher mechanical integrity than compression molding or additive manufacturing.

After the A/B blends are formed into a shape, the active polymeric component (A) can be extracted from the shape by exposing the shape to heat and/or a solvent or a solvent system to extract the active polymeric component (A) from the blend leaving the poroelastic biomaterial comprising the polyaryletherketone (PAEK) matrix polymer having a plurality of tortuous channels extending from one surface to another surface of the biomaterial, e.g., through the bulk of the biomaterial. The extraction process can be practiced under heat and pressure.

In one aspect, active polymeric component (A) can be extracted from the A/B blend with a solvent or solvent system, e.g., a solvent or a combination of solvents which is/are selected to swell the polyaryletherketone (PAEK) matrix and, the same or different solvent, selected to extract the active polymeric component (A) from the blend. The extraction process can be performed under heat and/or pressure to facilitate and accelerate the extraction of active polymeric component (A) from the blend. Such solvent or solvent system includes, for example, heated water in the form of steam, other polar solvents, such as ketones, such as methyl ethyl ketone, alcohols, such as ethanol, isopropanol, butanol, ethers, such as tetrahydrofuran, esters, such as ethyl acetate, halogenated solvent, such as dichloromethane, chloroform, aprotic solvents such as dimethylformamide (DMF), or N-methylpyrrolidone (NMP), dimethyl sulfoxide, acetonitrile, etc. In an embodiment, the solvent system includes an alcohol in combination with at least one aprotic solvent. Such a system can include, for example, at least one alcohol selected from ethanol, isopropanol, butanol, etc. in combination with at least aprotic solvent selected from dimethylformamide, N-methylpyrrolidone, dimethyl sulfoxide, acetonitrile, etc.

In one aspect, active polymeric component (A) can be extracted from the AB blend by heating the blend to decompose a degradable active polymeric component (A) such as an poly(alkene carbonate) that can decompose upon exposure to heat to generate carbon dioxide gas which escapes the blend leaving a plurality of tortuous channels in the matrix PAEK polymer. Such extraction processes, e.g., solvent-based and/or heat-based, can result in injected molded shapes leaving the poroelastic biomaterial comprising a polyaryletherketone (PAEK) matrix polymer intact without appreciable dimensional changes.

Once the poroelastic biomaterial is formed with tortuous channels, it can be loaded with one or more osteoconductive agents, such as by capillary action or transport of a liquid form of the agent(s) or in a liquid carrier including the agent(s) through the channels. In this manner one or more osteoconductive agents can be loaded throughout the bulk of the poroelastic biomaterial as well as various surfaces, e.g., top, bottom surfaces and/or load bearing surfaces.

Another aspect of the present disclosure includes an orthopedic implant device comprising an implant body including a poroelastic biomaterial according to the present disclosure. Such a device can include serrations or teeth projecting from a weight bearing surface of the device.

An orthopedic implant device having an implant body including a poroelastic biomaterial can be prepared by extracting an active polymeric component (A) from an injection molded shape of an orthopedic implant device. The injection molded shape includes a blend of the active polymeric component (A) with a matrix PAEK polymer (B). Extracting the active polymeric component (A) from an injection molded shape forms an implant body having a poroelastic biomaterial including a plurality of tortuous channels extending from one surface to another surface of the biomaterial. A blend of the active polymeric component (A) with the matrix PAEK polymer (B) can be injection molded into the shape, e.g., into a shape of an orthopedic implant device. The blend can be formed by melt compounding the active polymeric component (A) with the matrix PAEK polymer (B). The active polymeric component (A) can be extracted by heat and/or solvent.

For example, a process of forming an orthopedic implant device can include injecting molding a blend of an active polymeric component (A), e.g., PEI or a poly(alkene carbonate), with a matrix PAEK polymer (B), e.g., a polyetheretherketone (PEEK), into a shape of an orthopedic implant device. The active polymeric component (A) then can be extracted by heat and/or solvent to form an orthopedic implant device including an implant body having a poroelastic biomaterial including a plurality of tortuous channels extending from one surface to another surface of the poroelastic biomaterial.

Additionally, the poroelastic biomaterials of the present disclosure, and orthopedic implant device thereof, optionally can include additives, if desired, e.g., one or more osteoconductive agents to enhance osseointegration at the bone-implant interface, or to improve or speed bone regeneration, or resorption and replacement of the biomaterial. Such additives can be included on surfaces and/or throughout the bulk or core of the poroelastic biomaterial and/or orthopedic implant device. For example, the poroelastic biomaterials and/or device can include, on surfaces thereof, one or more growth factors (e.g., bone morphogenic protein (BMP)), transcription factors, matrix metalloproteinases, peptides, proteins, bone cells, progenitor cells, blood plasma, bone marrow aspirate, and combinations thereof.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Processing:

A. General Blending Procedures

Blends were prepared by dry mixing the active polymeric component (A) with the matrix PAEK polymer (B), such as in a blender, to form blends of the components.

In addition, a co-rotating twin screw extruder, such as a Coperion 26 mm with 44:1 L/D ratio, was used to prepare AB blends. Generally, an active polymeric component (A) in the form of pellets were premixed with a matrix PAEK polymer (B) in the form of pellets, e.g., PEI and PEEK pellets were premixed, in a desired weight composition (e.g., 5 to 25 parts PEI and 95 to 75 parts PEEK). Active polymeric component (A) and matrix PAEK polymer (B) are generally commercially available. For example, PEEK with standard flow can be obtained from Victrex's 450G and Solvay's 820, and their equivalent medical or implantable grades. PEK, PEKEKK, or PEKK can also be sourced from commercial vendors. PEI can be obtained as Sabic's Ultem 1010 although other similar material such as polyphenylene sulfone or polyethersulfone can also be used. The premixed pellets can then be introduced in the twin screw extruder and melt compounded to form a blend of component (A) with PAEK polymer (B) with heat. The temperature to melt compound the premixture will depend on the components (A) and (B) but is generally above the glass transition temperature of each component and generally below any degradation temperature of the components under the compounding conditions, e.g., above about 150° C. and no more than about 400° C.

B. Process to Form Shapes

The resulting blends were injection molded into various shapes with an extruder and molds, or extruded into stock shapes such as rods or plates.

C. Extraction Process

Injection molded shapes were extracted by heating a blend composed of a degradable active polymeric component (A) or by use of one or more solvents. In some instances, the solvent or solvent system was heated or heated under pressure.

For several examples, injection molded shapes were extracted in an autoclave at the specified solvent temperature with an appropriate pressure to maintain the solvent temperatures. Such processes resulted in injection molded shapes extracted with solvent(s) leaving the poroelastic biomaterial comprising the polyaryletherketone (PAEK) matrix polymer intact without appreciable dimensional changes.

Example 1. Preparation of Poroelastic Biomaterial Via PEEK and a Poly(Alkene Carbonate) Active Material Poly(alkene carbonate) copolymers such as poly(ethylene carbonate), poly(propylene carbonate), poly(propylene/cyclohexene carbonate), poly(cyclohexene carbonate), etc. are available from Empower Materials under the tradename QPAC®. These poly(alkene carbonate) can decomposed at elevated temperature in air (e.g., degradation onset in air at about 220° C.) to generated $CO_2$ gas and water. The glass transition temperature (Tg) and the decomposition temperature (Td) of several QPACs are summarized in Table 1 below.

TABLE 1

Summary of the thermal properties of QPACs
(data available from Empower Materials)

| Samples | Composition of the Sample | Tg (° C.) | Td (° C.) (onset) |
|---|---|---|---|
| Q25 | Poly(ethylene carbonate) | 0-10 | 220 (estimate) |
| Q40 | Poly(propylene carbonate) | 15-40 | 250 (estimate) |
| Q100 | Poly(cyclohexene propylene carbonate | 90-100 | 250 |
| Q130 | Poly(cyclohexene propylene carbonate | 120-130 | 250 |

In a typical procedure, a QPAC powder and PEEK (Pyramid KD2000) are combined to form a blend by dry mixing in a blender. The amount of QPAC will affect the morphology of the blend. For these examples, Q100 in an amount ranging from about 5 wt % to about 20 wt % of the total blend were prepared. The blend is then injection molded into a shape at 350° C. QPAC Q100 decomposes and releases $CO_2$ in the molding process. The resulting poroelastic PEEK had tortuous channels with diameter sizes in a range of 800 microns to 2,500 microns, which were measured by a scaled microscope.

Comparative Example 1. Preparation of PEI/PEEK and DMF or NMP Extraction Solvent High performance polyetherimide (PEI) is soluble in polar organic solvents. As an example, a melt compounded blend of PEI/PEEK was prepared from anywhere from 10-20 wt % of PEI in a twin screw extruder at 350° C. The resulting blend was then injection molded into a series of shapes for analysis. For these samples, dimethyl formamide (DMF) or N-methylpyrrolidone (NMP) were used singularly as a solvent to extract the PEI from the PEEK matrix at elevated temperatures. Injection molded shapes prepared from the blends were subsequently submerged in either solvent at 160° C. to 190° C. for 72 to 90 hours. Since neither DMF nor NMP substantially affect the PEEK matrix, only some minor etching of the surface of the shape was observed. No channels were formed in the blend under the conditions tested in these examples.

Example 2. Preparation of Poroelastic Biomaterial Via PEI/PEEK and Solvent Systems A solvent system was selected to extract the active polymeric component (A), e.g., PEI from a PEI/PEEK shaped blend. The selection was made such that one solvent can swell and penetrate the PEEK matrix while another solvent can extract the active polymeric component (A) such as PEI. Isopropyl alcohol (IPA) can swell and penetrate a PEEK matrix and DMF and NMP can extract PEI. In addition, IPA is miscible with either DMF or NMP. In a typical example, melt blended and injection molded PEI/PEEK samples were generated by the same processes as described in Comparative Example 1 above. DMF/IPA or NMP/IPA solvent systems were used to extract PEI from the injection molded PEI/PEEK blends. The weight percentage of DMF or NMP in the DMF/IPA or NMP/IPA solvent systems were in a range from 10 wt % to 50 wt % of the total solvent system.

Example 3. Preparation of Poroelastic Biomaterial Via PEI/PEEK and Solvent Systems in Autoclave To enhance the extraction process, an autoclave can be used since the desirable extraction temperatures can be above a solvent's boiling point. The autoclave further can serve to sterilize the injection molded medical device.

In a typical example, an injection molded PEI/PEEK sample was generated by the same processes as described in Comparative Example 1. Since PEEK in a PEI/PEEK blend has a relatively slow crystallization rate, PEEK can be manipulated into different morphologies, e.g., in either a semi-crystalline or an amorphous state, during the injection molding process. Solvent systems DMF/IPA in a ratio of 2:3 and NMP/IPA in a ratio of 1:2 were then used in an autoclave to extract PEI from injection molded PEI/PEEK blend shapes. The injection molded PEI/PEEK blend shapes were extracted with the solvent pairs at about 220° C. for 72 to 90 hours as a general procedure. For certain samples, the extracted PEEK poroelastic material was subsequently annealed at a temperature of 220° C. for about 12 hours.

Table 2 below provides the approximate diameter channel size ranges for the materials prepared for Comparative Example 1 and Example 3.

TABLE 2

| PEI/PEEK Solvent Treatment Conditions | | | | | |
|---|---|---|---|---|---|
| PEI/PEEK Composition, wt % | Amorphous (A) or Semi-Crystalline (C) | Observed Channel Sizes (μm)† (after treatment with solvent listed below) | | | |
| | | DMF ‡ | NMP ‡ | DMF/IPA 2:3 | NMP/IPA 1:2 |
| 10 | A | Irregular surface line marks only | | 300-500 | 300-500 |
| 10 | C | | | | |
| 25 | A | | | 50-200 | 50-200 |
| 25 | C | | | | |

†The pore size was measured by scaled microscopy.
‡ Samples treated with DMF and NMP as a single solvent are from Comparative Example 1. No channels were formed under the conditions tested.

Figure 1C:
FIG. 1C is an optical micrograph showing ink (dark regions (1)) that has penetrated and migrated (from the bottom to the top of the image) a poroelastic biomaterial prepared according to aspects of the present disclosure.

FIGS. 1A-C show images of a poroelastic biomaterial (poroelastic PEEK). FIG. 1A shows an optical micrograph of the poroelastic biomaterial and FIG. 1B shows a micro-computed tomography (micro-CT) image of the poroelastic biomaterial. FIG. 1C is an optical micrograph showing the progress of ink (composed of a dye and solvent) penetrating the poroelastic PEEK matrix polymer. As shown in FIG. 1C, a dark region (1) represents a region in which ink has penetrated and a light region (2) represents a region in which the ink has not yet permeated. Over time, the ink penetrates the entire poroelastic PEEK. As an indication of the presents of tortuous channels from a top surface through the bulk to a bottom surface of the poroelastic biomaterial, liquids such as ink flows from the top surface to exit the bottom surface of the biomaterial.

By a similar process, poroelastic biomaterials of the present disclosure can be loaded with one or more osteoconductive agents. For example, one or more osteoconductive agents in liquid form or in a liquid carrier can be loaded throughout the bulk of the poroelastic biomaterial via transport through the channels. Further, if a liquid carrier was used, the liquid carrier can be evaporated to leave the one or more osteoconductive agents loaded in interior surfaces of the channels throughout the bulk or core of the poroelastic biomaterial. The one or more osteoconductive agents can also be applied on top, bottom surfaces and/or load bearing surfaces.

Figure 2A:
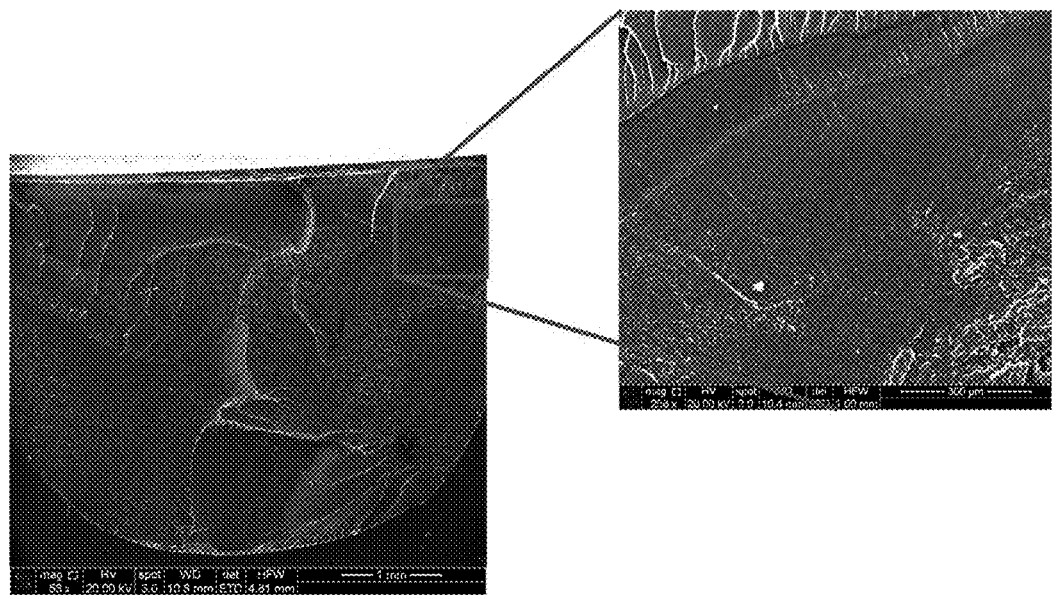
FIGS. 2A and 2B are SEM images.
Figure 2B:
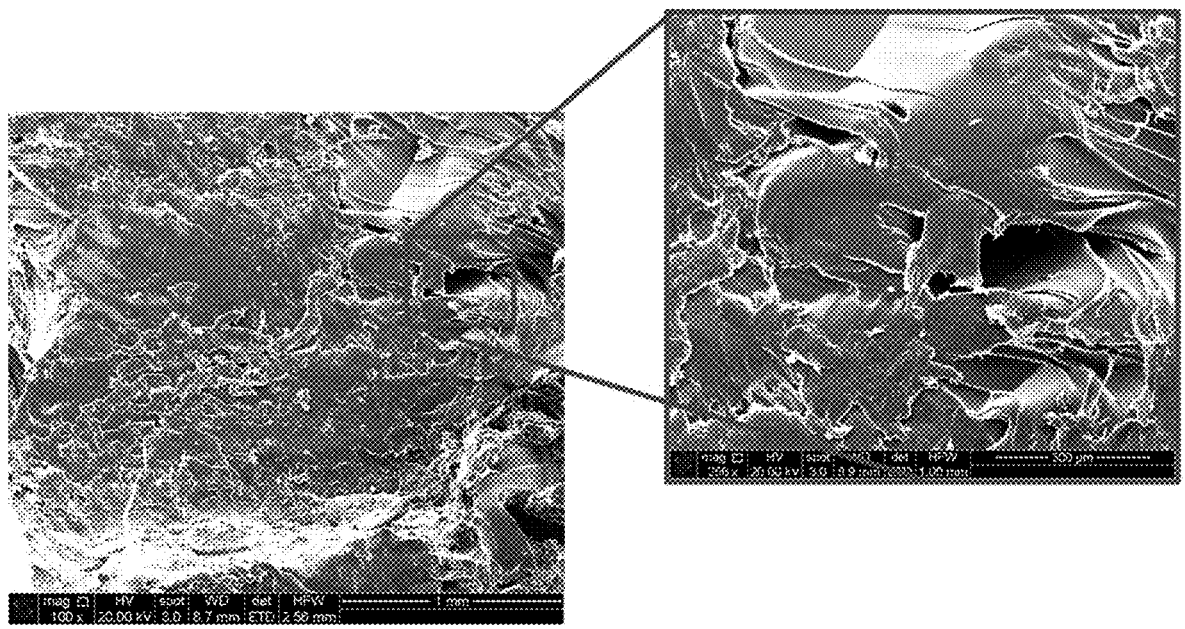

FIGS. 2A and 2B show images of a commercial implant device made from PEEK (FIG. 2A) and of a poroelastic biomaterial prepared according to aspect of the present disclosure (FIG. 2B), respectively. As shown by the image of FIG. 2B a poroelastic biomaterial prepared according to aspect of the present disclosure has channels through the bulk of the material which allows for cell adhesion and bone growth. Samples were fractured through their midsection and sputter coated with gold as known in the art. Images were obtained using scanning electron microscopy. The commercial implant displayed an internally homogenous and smooth surface. In contrast, the poroelastic biomaterial prepared according to process of the present disclosure displayed high surface roughness and observable microchannels.

FIGS. 3A, 3B and 3C are SEM images comparing different PEEK materials. In particular, FIG. 3A shows a commercial spinal implant device made from PEEK; FIG. 3B shows a machined bulk, unfilled PEEK; and FIG. 3C shows a poroelastic PEEK prepared according to aspect of the present disclosure. As shown in FIG. 3C, the poroelastic PEEK matrix polymer has a plurality of void that represent the tortuous channels through the matrix. The void/channels are distributed throughout the bulk of the poroelastic PEEK matrix.

Table 3 provides mechanical properties of several poroelastic biomaterials prepared according to aspects of the present disclosure. The "as Molded" sample provided in Table 3 is a 10/90 parts blend of PEI/PEEK that was injection molded into a shape. The "Extracted" sample provided in Table 3 is a 10/90 parts blend of PEI/PEEK that was injection molded into a shape followed by extraction with a solvent system at a temperature of about 220° C. to remove the PEI from the injection molded shape and form a poroelastic PEEK having tortuous channels through the PEEK matrix. The "Extracted & Annealed" sample provided in Table 3 is a 10/90 parts blend of PEI/PEEK that was injection molded into a shape followed by extraction with a solvent system at a temperature of about 220° C. to remove the PEI from the injection molded shape and form a poroelastic PEEK having tortuous channels through the PEEK matrix. The poroelastic PEEK was subsequently annealed at a temperature of 220° C. for about 12 hours.

TABLE 3

Compressive properties of blends and poroelastic biomaterial samples

| Property | Test Method (ASTM) | Unit | Bulk PEEK (as molded) | Test Value | | |
|---|---|---|---|---|---|---|
| | | | | As Molded | Extracted | Extracted & Annealed |
| Compressive Strength at Yield | D695 | Kpsi (MPa) | 20.7 (142.7) | 21.2 (146.2) | 14.8 (102.1) | 16.6 (114.5) |
| Compressive Strain at Break | D695 | % | 21.4 | 27 | 47.10 | 89.70 |
| Compressive Modulus | D695 | Mpsi (MPa) | 0.18 (1,240) | 0.18 (1,240) | 0.14 (975.9) | 0.15 (1,000) |
| Compressive Stress @ 10% strain | D695 | Kpsi (MPa) | 16.3 (112.4) | 15.4 (106.2) | 12.6 (86.9) | 13.90 (95.84) |

Figure 4A:
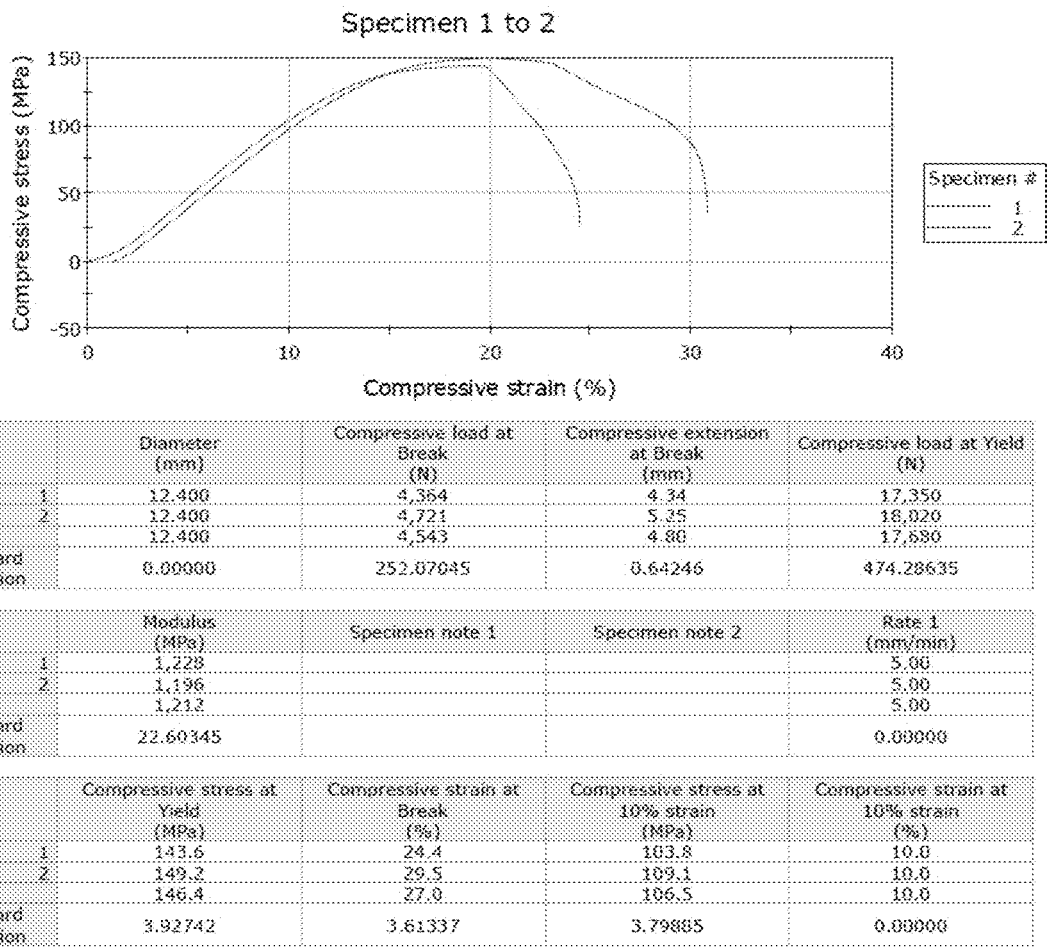
FIGS. 4A and 4B are graphs showing compressive stress versus compressive strain curves for a blend of PEI/PEEK injection molded into a part and samples of a poroelastic biomaterial according to aspects of the present disclosure.
Figure 4B:
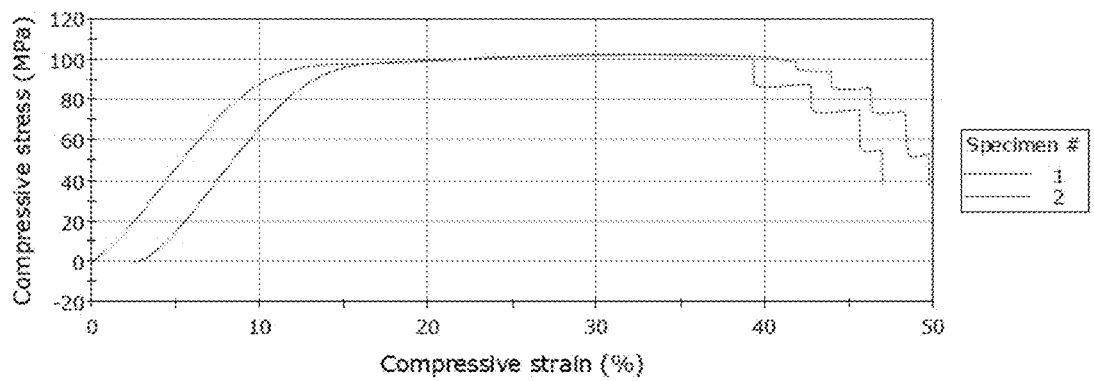

FIGS. 4A and 4B are graphs showing compressive stress versus compressive strain curves for the samples provided in Table 3 above. FIG. 4A is a stress-strain curve of as Molded samples and FIG. 4B is a stress-strain curve of Extracted samples. Testing was performed according to ASTM D695 (Standard Test Method for Compressive Properties of Rigid Plastics). The specimens were 12.4 mm width×12.4 mm width×49.1 mm length; all specimens were tested at the rate of 5 mm/min. and conditioned at 75° F. for 24 hrs in the lab.

As shown by the data in Table 3, the stress-strain behavior of as Molded samples is similar to bulk PEEK without channels or voids. Further, the compressive strength at yield and compressive modulus of the Extracted & Annealed sample is at least 60% of the values for injection molded bulk PEEK without channels or voids as shown in Table 3. As shown by the curve in FIG. 4B, the ductility of the poroelastic biomaterial can be at least as great as the corresponding bulk PAEK polymer without tortuous channels or porosity. For the example of FIG. 4B (a poroelastic PEEK matrix polymer according to the present disclosure), the compressive strain at break is at least 40%, which is nearly double the value of an injection molded bulk PEEK (21.4%).

Figure 5:
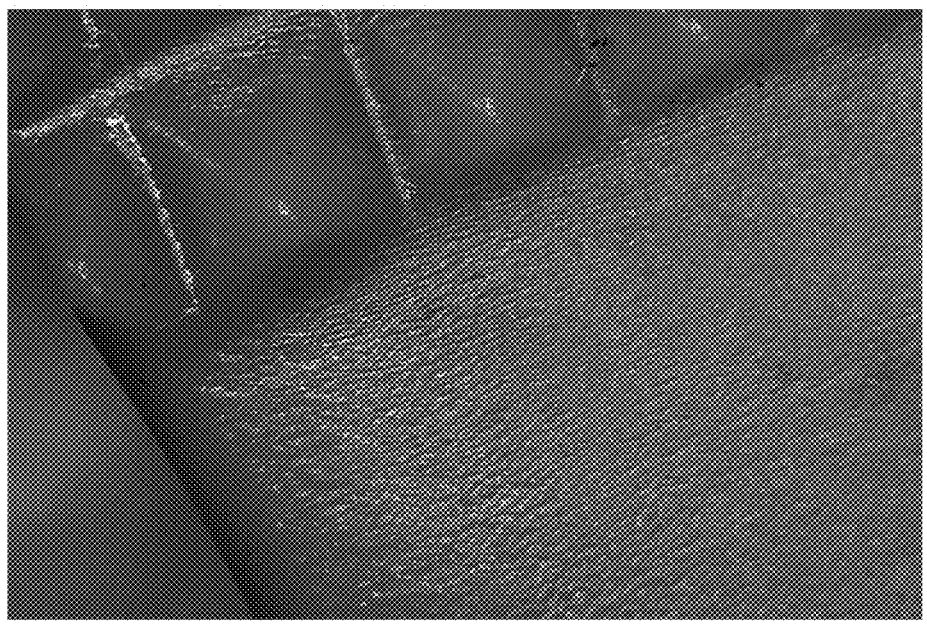
FIG. 5 is an image of a part made from a poroelastic biomaterial according to aspects of the present disclosure. The image shows a series of teeth projecting from a weight bearing surface of the part.

FIG. 5 is an image of an injection molded part made from a poroelastic biomaterial according to aspects of the present disclosure. The image shows a series of teeth like projections on the device that were formed by injection molding the part and a texture on the surface of the device due to the microchannels of the device.

Figure 6A:
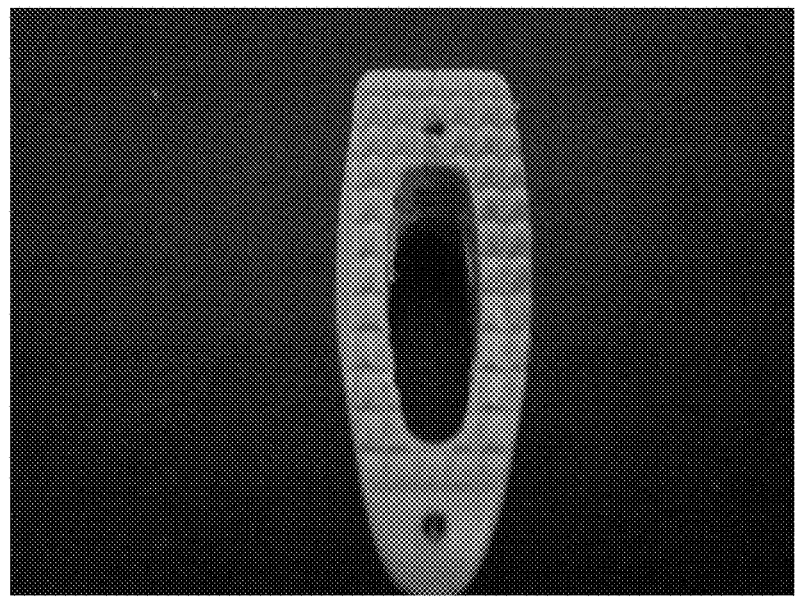
FIGS. 6A and 6B are images of an injection molded orthopedic implant device including an implant body having a poroelastic biomaterial according to aspects of the present disclosure.
Figure 6B:
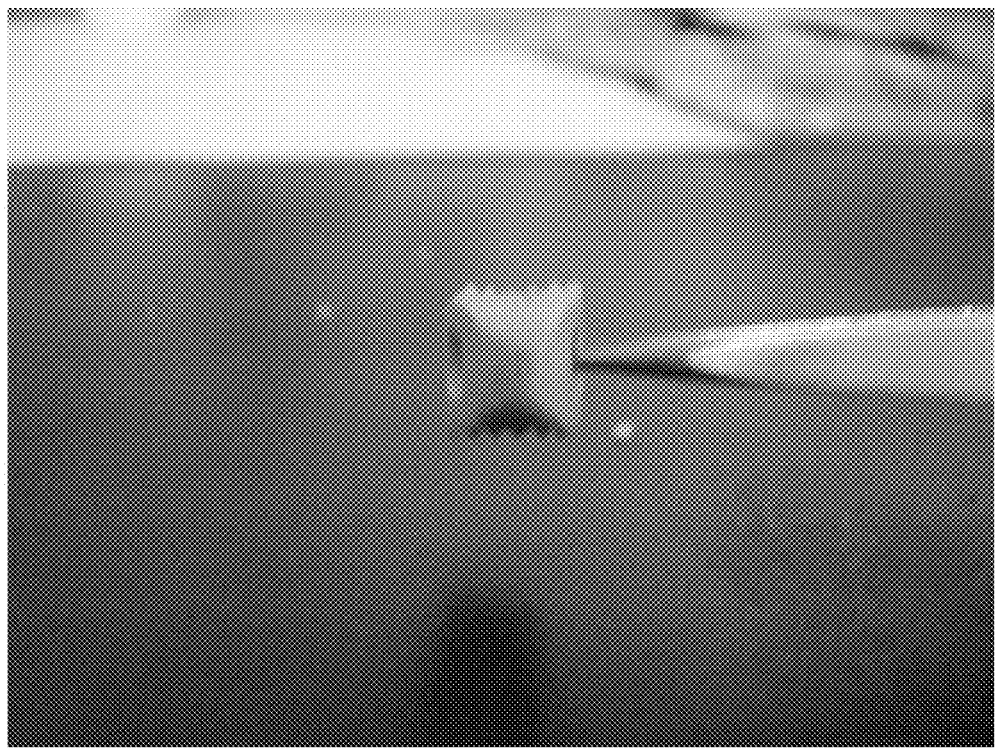

FIGS. 6A and 6B are images of an injection molded orthopedic implant device including a poroelastic biomaterial according to aspects of the present disclosure. The injection molded orthopedic implant device is shown after release for the mold and prior to further shaping to remove extraneous material. As shown, the injected molded orthopedic implant device is a cage structure with a body including the poroelastic biomaterial. The body further includes teeth projecting from both a top and bottom surface, weight bearing surfaces, of the device.

Mineralization Experiment

In an experiment, bulk PEEK (obtained from Polymics) was machined into a disc (2 mm thick) and a blend of PEI/PEEK was machined into a disc (2 mm thick). Both discs were treated with the solvent system. The PEI/PEEK disc treated with the solvent system extracted the PEI and resulted in a poroelastic PEEK (labeled OP490). The discs were then autoclaved and added to cell culture wells. Saos-2 (Siga-Aldrich) cells were then plated and cultured on the discs using standard conditions according to manufacturer instructions. After two weeks, with media exchanges every 3 days, the discs were stained with Alizarin-Red and the amount of mineralized deposited was quantified using UV-Vis spectroscopy.

Figure 7:
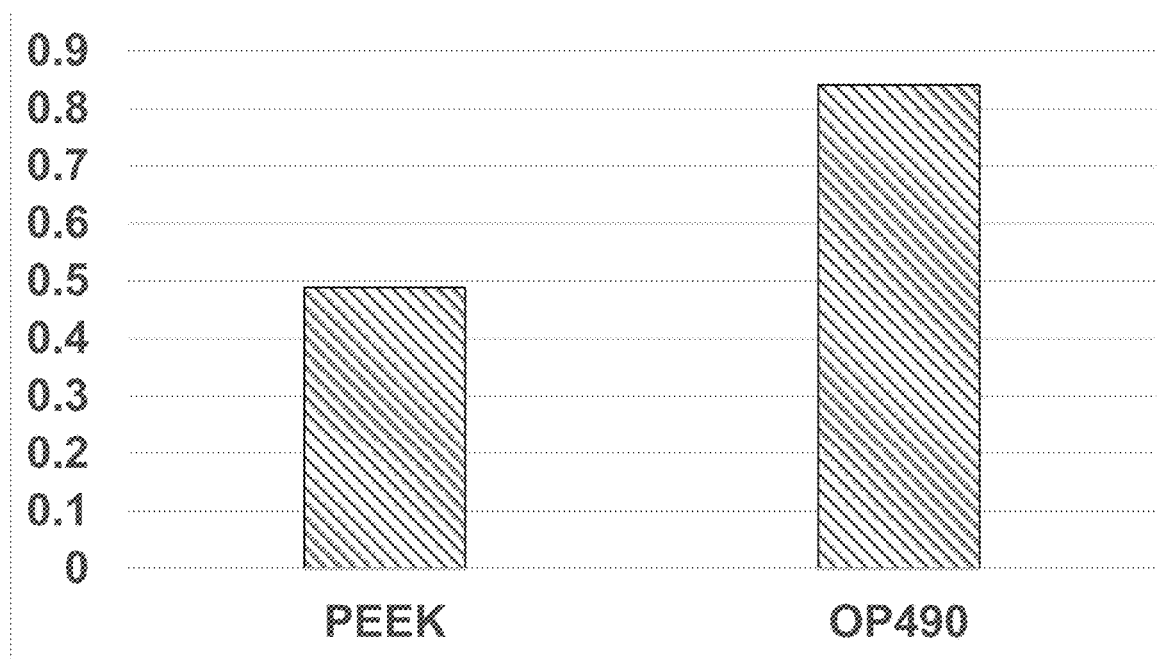
FIG. 7 is a graph comparing mineralization of bulk PEEK with a poroelastic PEEK prepared according to aspect of the present disclosure.

FIG. 7 is a graph comparing the mineralization of the bulk PEEK with the poroelastic PEEK (OP490) as prepared in the preceding paragraph. As shown by the data in FIG. 7, the poroelastic PEEK prepared according to aspect of the present disclosure (OP490) had an increase of over 35% mineralization compared to the bulk PEEK. The increased mineralization is an indication of the hydrophilic nature of the poroelastic PEEK prepared according to aspect of the present disclosure. This data further shows that a poroelastic PEEK of the present disclosure advantageously can reduce surface tension sufficiently for better nutrient absorption. It appears that the interporosity of the poroelastic PEEK prepared according to aspect of the present disclosure wicks and redistributes fluids comparable to bone function and facilitates adhesion of cells thereto. Furthermore, this experiment shows that extraction of PEEK without an extractable component does not impart favorable mineralization conditions as in a poroelastic PEEK prepared according to the present application.

Comparative Example 2. Preparation of PKHH/PEEK Blends and DMF or NMP Treatments Phenoxy resin is a thermoplastic polymer derived from bisphenol A and an epoxy. These polymers have terminal hydroxyl groups as well as hydroxyl groups in repeating units and thus can be classified as polyhydroxyethers. PKHH is a standard phenoxy resin from Gabriel Performance Products. PKHH is soluble in most polar organic solvents and miscible with PEEK. A PEEK/PKHH blend can be used to make a porous PEEK by extraction of PKHH from the PEEK blend with polar organic solvents. For this experiment, a twin screw extruder was used to compound PKHH with PEEK (Pyramid KD2000) at 350° C. The weight percentage of PKHH in PKHH/PEEK blend ranged from 10 to 20 wt %. The resulting melt compounded blend was then injection molded into a shape. The molded shapes were submerged in a polar solvent, such as dimethyl formamide (DMF) or N-methylpyrrolidone (NMP) and heated at about 160-190° C. for 72 to 90 hours to extract PKHH. The resulting extracted PKHH/PEEK sample contains pores on the surface only, with pore sizes less than 0.1 micron measured by a scaled optical microscope.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A poroelastic biomaterial comprising
a polyaryletherketone (PAEK) matrix polymer; and
a plurality of tortuous channels extending from one surface to another surface of the biomaterial; and
wherein the biomaterial has a compressive strain at break at least as high as a corresponding PAEK polymer without channels or porosity.

2. The poroelastic biomaterial of claim 1, wherein the poroelastic biomaterial has a porosity from about 5% to about 40%.

3. The poroelastic biomaterial of claim 1, wherein the PAEK matrix polymer comprises a polyetheretherketone (PEEK) matrix polymer.

4. The poroelastic biomaterial of claim 3, wherein the PEEK matrix polymer has a compressive modulus of from about 300 megapascals (MPa) to about 1,500 MPa.

5. The poroelastic biomaterial of claim 3, wherein the PEEK matrix polymer has a compressive strength at yield of from about 20 MPa to about 140 MPa.

6. The poroelastic biomaterial of claim 3, wherein the PEEK matrix polymer has a compressive strain at break of at least 40%.

7. The poroelastic biomaterial of claim 3, wherein the plurality of tortuous channels have a size in the range of from about 10 microns to about 800 microns.

8. The poroelastic biomaterial of claim 7, wherein the PEEK matrix polymer has a compressive strain at break of at least 50%, and wherein the PEEK matrix polymer has a compressive modulus of from about 300 megapascals (MPa) to about 1,500 MPa.

9. The poroelastic biomaterial of claim 3, wherein the PEEK matrix polymer has a compressive strain at break of at least 50%.

10. An orthopedic implant device comprising an implant body including the poroelastic biomaterial of claim 1.

11. The orthopedic implant device of claim 10, further comprising one or more additives on surfaces of the poroelastic biomaterial, wherein the one or more additives are selected from growth factors, transcription factors, matrix metalloproteinases, peptides, proteins, bone cells, progenitor cells, blood plasma, bone marrow aspirate, and combinations thereof.

12. The orthopedic implant device of claim 10, further comprising serrations or teeth projecting from a weight bearing surface of the orthopedic implant device.

13. A process of forming a poroelastic biomaterial, the process comprising:
extracting an active polymeric component (A) from an injected molded shape comprising a blend of the active polymeric component (A) with a matrix PAEK polymer (B) to form the poroelastic biomaterial of claim 1.

14. The process of claim 13, further comprising melt compounding the active polymeric component (A) with the matrix PAEK polymer (B) to form the blend.

15. The process of claim 13, further comprising injection molding the blend of the active polymeric component (A) with the matrix PAEK polymer (B) into the shape.

16. The process of claim 13, comprising extracting the active polymeric component (A) from the blend with steam.

17. The process of claim 13, comprising extracting the active polymeric component (A) from the blend with a solvent system including at least one alcohol in combination with at least one aprotic solvent.

18. The process of claim 13, wherein the active polymeric component (A) comprises PEI or a poly(alkene carbonate).

* * * * *